April 1, 1930.  R. H. MOULTON  1,752,537
GREASE DISPENSER
Filed Jan. 12, 1927
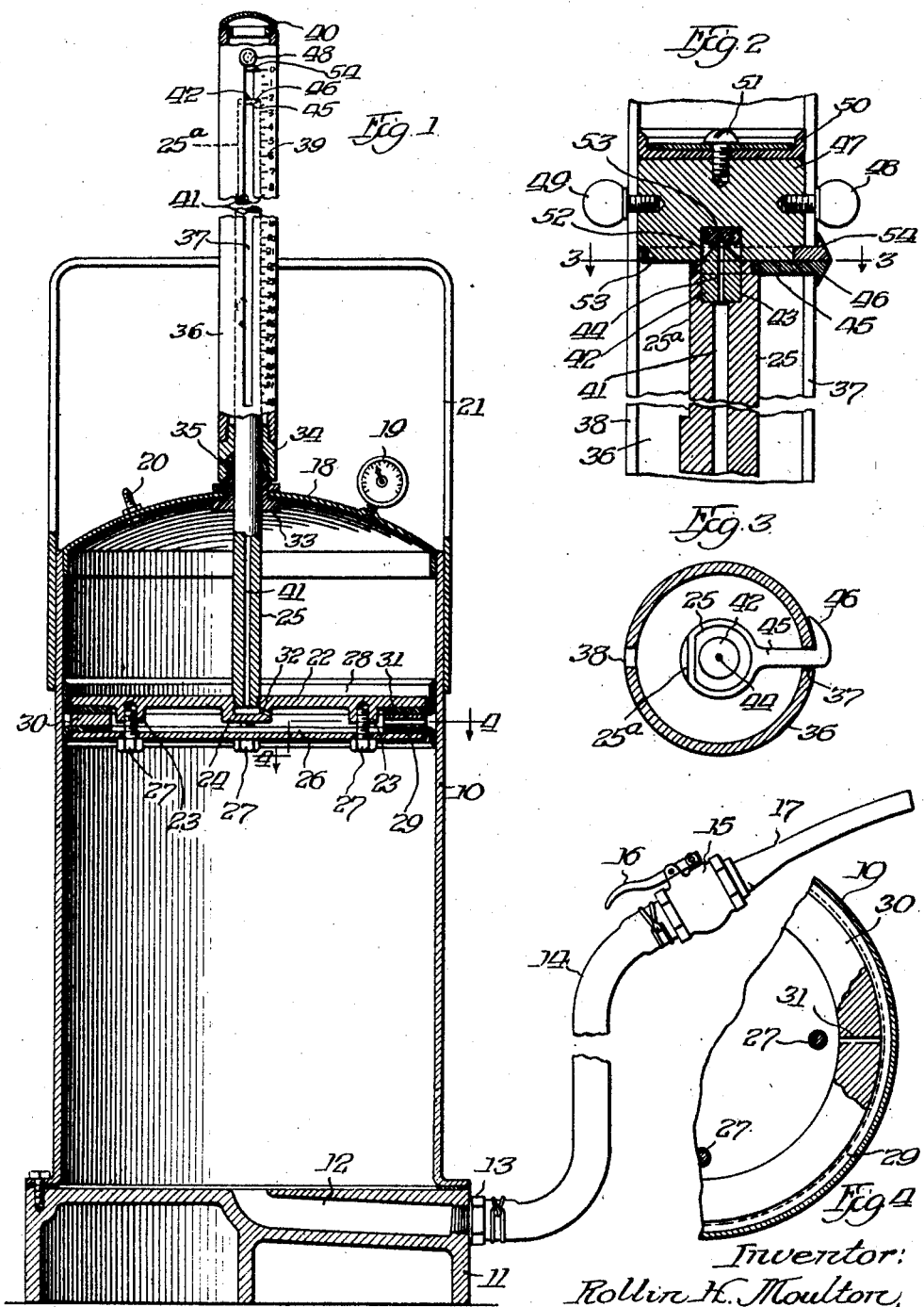
Inventor:
Rollin H. Moulton, Patented Apr. 1, 1930

1,752,537

UNITED STATES PATENT OFFICE

ROLLIN H. MOULTON, OF BERWYN, ILLINOIS

GREASE DISPENSER

Application filed January 12, 1927. Serial No. 160,607.

My invention relates to portable lubricant dispensing apparatus and has particular reference to dispensing apparatus in which compressed air or other fluid is used as an operating means for the dispenser and has particular reference to a novel piston construction by means of which the leakage of the compressed air from one compartment of the container to the lubricant compartment, is prevented.

In practice I have found that in the piston type grease dispensing apparatus there is liable to be a leakage of compressed air from the side of the chamber adapted to contain the compressed air, around the piston and into the compartment containing the lubricant, particularly at the initial delivery of the grease from the container. This results in bubbles or air pockets being formed in the lubricant preventing the proper travel of the piston, so that when the valve controlling the discharge nozzle is open, lubricant may be forced from the container by the air pressure built up in the lubricant rather than by the moving piston thereby rendering the measuring device inoperative or inaccurate. In my improved apparatus, the compressed air which leaks around the piston is retained in the hollow space in the piston and also in a hollow piston shaft and vented to the atmosphere so that the leakage into the lubricant is prevented and accurate and proper operation of the device is assured.

It is therefore an object of this invention to provide a grease dispensing apparatus which will positively and accurately measure quantities of dispensed grease.

Another object is the provision of a. portable lubricant dispenser having a novel piston construction adapted to trap the air leakage from the compressed air side of the dispenser and also having means whereby said air is released to the atmosphere.

A further object of my invention is the provision of a grease dispensing apparatus similar to that shown and described in my co-pending application Serial No. 151,924, filed December 1, 1926, and in which the leakage of compressed air into the lubricant compartment is prevented and the quantity of grease dispensed or the proper measuring of the grease dispensed from the machine is not affected.

A still further object is to provide a grease dispensing device so arranged as to provide a check on the discharge at a predetermined point.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a vertical sectional elevation of my improved invention;

Figure 2 is a detailed view showing the hollow piston stem and valve at the upper end thereof;

Figure 3 is a cross sectional view on lines 3—3 of Figure 2; and

Figure 4 is a fragmentary view of the piston on lines 4—4 of Figure 1.

The cylindrical container 10 is mounted upon a base 11 in any suitable manner, the said base 11 having a conduit 12 centrally communicating with said container and extending outwardly toward one side of the base 11 where an externally threaded nipple 13 is provided in threaded engagement with the base 11 and in alignment with the conduit 12 with a flexible hose 14 of any desired length being secured to the nipple 13 in any desired manner. At the free end of the hose 14 a valve 15 is provided which is operated by a handle 16 with a discharge nozzle 17 projecting outward from said valve and through which the lubricant is dispensed into the differential and transmission housings of an automobile. The container 10 has a cover 18 secured to the upper end of the said container in any suitable manner with a pressure gauge 19 being provided which is fixed to the cover in any suitable manner for the purpose of indicating the pressure in the upper part of the container 10. An intake valve 20 is secured to said cover 18 through which the compressed fluid, such as compressed air or the like, is forced into the container 10 by being connected to an air hose or the like, in the same manner that automobile tires are now filled with air. A bail 21 is secured to the container 10 in any suitable manner to allow for easy handling of the container 10 from place to place as may be desired.

Movably positioned in the container 10 is a piston composed of an upper plate 22 having a plurality of downwardly extending spaced lugs 23, 23 formed thereon and having a downwardly projecting central portion 24 which is internally threaded, and which forms a recess in the upper side of said plate within which a hollow piston rod 25 extends, the said piston rod 25 being in threaded engagement with the plate 22. A lower plate 26 is provided which is secured to the upper plate by a plurality of bolts 27, 27 which extend through the lower plate and into the lugs 23, 23 formed integrally with the upper plate 22. An upper annular gasket or leather 28, preferably of leather or other flexible material, is provided having a vertical portion engaging against the wall of the container 10 and a horizontal portion which extends underneath the outer edge of the plate 22. A lower annular gasket 29 is also provided which is formed similarly to the upper gasket 28 except that the portion thereof engaging the side wall of the container 10 is turned downward and is adapted to prevent leakage of the lubricant in the lower part of the container around the piston.

A ring 30 is provided which is interposed between the upper gasket 28 and the lower gasket 29, this ring 30 having a port 31 extending from the outer edge thereof through the ring in a horizontal direction for the purposes hereinafter described. The piston thereby being built up and clamped together by means of the bolts 27, 27 against the ring 30, it will be noted a considerable space is formed between the upper plate 22 and the lower plate 26. The projection 24 has a port 32 in one side thereof which connects with the free space between the upper and lower plates and the space below the end of the piston rod 25 for the purpose of allowing the air which is trapped between the plates to escape.

The piston rod 25 extends upwardly through the cover plate 18 through an externally threaded gland 33, in engagement with the cover plate and has a second gland member 34 cooperating therewith with packing 35 positioned between these gland members and around the rod 25. A hollow pipe 36 is secured to the upper end of the gland member 34 by being in threaded engagement therewith, the said pipe 36 being provided with a pair of longitudinally extending slots 37 and 38 and having a series of calibrations 39, 39 thereon adjacent the slot 37 for the purpose of indicating the quantity of lubricant dispensed from said container as hereinafter described. A cap 40 is placed in the upper end of the pipe 36 for the purpose of preventing dirt or other refuse falling into the pipe 36 and interfering with the operation of the device.

The rod 25 has an opening 41 extending throughout its entire length and has a nipple 42 seated in a recess 43 formed in the upper end of the said pipe, the upper end of the nipple being conical in shape and having a longitudinally extending passage 44 therethrough which connects with the longitudinal passage 41 formed in the rod 25, but being of materially less diameter than the passage 41 through the rod 25. A member 45 is secured to the upper end of the rod 25 having an indicating portion 46 thereon, this indicating portion representing the lower half of an arrow head which travels along the surface of the pipe 36 adjacent the calibrations 39, for the purpose of indicating the travel of the rod 25 and the piston.

A sliding member 47 is provided having a pair of thumb nuts 48 and 49 secured thereto which project through the slots 37 and 38 in the pipe 36 to allow for the manual movement of this member, with a gasket 50 being provided which is held in position by a screw 51 placed in the upper end of the member 47, the said member 47 having a recess 52 formed in the lower surface thereof within which packing 53 of any suitable character is provided, which is adapted to engage the member 42 and to close the passage 44 in the member 42. An indicating member 53 is secured to the under side of the member 47 and has an upper half of an arrow head 54 extending outward therefrom along the calibrations 39 on the pipe 36, the two members 46 and 54 forming an arrow head having points which extend to and terminate adjacent the calibrations 39 so that the travel of the piston in the container 10 can be determined by the position of these members. The upper end of the piston rod 25 is flattened at 25ª which allows the compressed air in the upper portion of the container 10 to escape when the piston approaches the bottom of the container 10.

In operation the container is filled with lubricant either in liquid or plastic form by securing the nozzle 17 to any pressure system and a quantity of lubricant forced into the container, which raises the piston, the air in the container 10 being released through the valve 20. The valve 15 is thereupon closed and compressed air admitted to the upper side of the container 10 through the valve 20 to a pressure preferably of about 75 pounds, this pressure being indicated by the gauge 19. As the air is admitted to the upper part of the container 10, the piston will be driven downward until the resistance afforded by the lubricant equals the air pressure, whereupon the piston remains in a stationary position and the plug 47 is thereupon brought down into engagement with the upper end of the rod 25 thereby closing the passage 44 in the nipple 42. In this condition there is apt to be a leakage of the compressed air around the edges of the gasket 28 and which passes through the opening 31, collects in the space between the upper plate 22 and the lower plate 26 and in the passage 41 in the rod 25, but being prevented from escaping by reason of the engagement of the plug 47 with the nipple 42. This leakage may continue until the pressure approximates that in the upper part of the container 10.

I have also found that when the device stands for a considerable length of time, the air leakage causes a film of air to collect between the gasket 28 and the side of the container 10 which pressure passes into the lubricant unless relieved in some other manner, upon opening the valve 15 to disclose some of the lubricant. This pressure may be so great as to hold the gasket 28 away from the side of the container long enough for a considerable amount of air passing the gaskets and entering the lower part of the chamber. In my present device as soon as the piston is moved slightly, the air escapes through the vent 44 reducing the pressure between the piston plates to that of the atmosphere, also removing any air which has collected between the gasket 28 and the container 10. The air in the upper part of the container immediately exerts its force against the gasket 28 causing it to seat tightly against the container 10 and preventing any flow of air past the gasket 28.

After all of the lubricant which is desired to be placed into the transmission or differential housing has been forced from the container 10, the operator, noting the position of the member 46, computes the quantity of lubricant discharged from the container 10, by the calibrations on the pipe 36 depending upon the distance between the indicator 54 and the indicator 46. After this has been done, the plug 47 is moved manually downward in the pipe 36 by the operator so that the passage 44 and the nipple 42 is again closed preventing any escape of air from the spaces heretofore described, but any amount of slow leakage again collects in these spaces where it is released by each successive operation of the device. It will be understood that the calibrations on the pipe 36 are computed in relation to the diameter of the container 10 so that a predetermined travel of the piston as measured by the calibrations, indicates the quantity of lubricant which has been dispensed from the container 10.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. Grease dispensing apparatus comprising in combination, a casing, a movable piston in said container comprising a head and a hollow rod, a hollow member connected to said casing within which said hollow rod extends, a valve member connected to said rod, a sliding valve mounted in said hollow member and adapted to engage said valve member to normally close the passage in said rod, and lubricant discharge means connected to said container, the said piston head being composed of a pair of spaced plates, one of said plates having an opening therethrough whereby communication is established between the hollow piston rod and the space in the piston head formed by the spaced plates.

2. Grease dispensing apparatus comprising in combination, a casing, a movable piston in said casing comprising a head and a hollow rod, a hollow member connected to said casing within which said hollow rod extends, a valve member connected to said rod, a sliding valve mounted in said hollow member and adapted to engage said valve member to normally close the passage in said rod, lubricant discharge means connected to said container, the said piston head being composed of a pair of spaced plates, one of said plates having an opening therein whereby communication is established with the hollow piston rod and the space between the said plates and a ring between said plates having access provided therethrough.

3. Grease dispensing apparatus comprising in combination, a container, grease discharging means connected to said container, a movable piston mounted in said container, the said piston having space therein adapted to receive leakage from said container, and a valve normally retained in closed position to prevent leakage from escaping but allowing leakage to escape upon movement of the piston.

4. Grease dispensing apparatus comprising in combination, a container, grease discharge means connected to said container, a movable piston in said container comprising a head having a hollow rod, the said piston head having a pressure receiving space formed therein for leakage around said piston and having an opening communicating with the said hollow piston rod, and a valve cooperating with said piston rod for normally closing the opening therein.

5. Grease dispensing apparatus comprising in combination, a container, a discharge pipe connected to said container, a movable piston mounted in said container comprising a pair of spaced plates having an opening therebetween, and a piston rod having an opening therethrough connected to one of said plates, said plates having an opening therethrough for communication with the said piston rod, a hollow rod connected to said container into which the said piston rod extends, and a sliding valve member mounted in said hollow rod adapted to co-act with the said piston rod for opening and closing the opening therethrough.

6. Grease dispensing apparatus comprising in combination, a container, a discharge pipe connected to said container, a movable piston mounted in said container comprising a pair of spaced plates having an opening therebetween, and a piston rod having an opening therethrough connected to one of said plates, said plates having an opening therethrough for communication with the said piston rod, a hollow rod connected to said container into which the said piston rod extends, a sliding valve member mounted in said hollow rod adapted to coact with the said piston rod for opening and closing the opening therethrough, an indicating member connected to the upper end of said piston rod, and a cooperating gauge member connected to said valve member.

7. In a device of the character described, the combination of a container, a piston disposed in and operative with said container to expel the contents of said container on movement of said piston, a piston rod secured to said piston, said piston and rod having means for releasing fluid leakage only upon actuation of said piston from its initial position.

8. In dispensing apparatus, the combination of a fluid container, discharge means therefrom, a piston movable in said container and having a fluid leakage receiving portion, means associated with and movable with respect to said piston for indicating the positions of said piston before actuation, said means permitting fluid leakage from said piston only after movement of said piston from said first named positions.

9. In lubricant dispensing apparatus, the combination of a lubricant container, discharge means therefrom, fluid actuated lubricant discharge means in said container having leakage trapping construction, outlet means from said lubricant discharge means, and valve members cooperating with said outlet means for permitting and preventing exhausting of said leakage.

10. In lubricant dispensing apparatus, the combination of a lubricant container, discharge means therefrom, a fluid actuated piston for expelling lubricant through said discharge means, said piston having a leakage trap, a member communicating with said trap for indicating the position of said piston, and means associated with said last named member for indicating positions of said piston and preventing leakage from said traps at selected positions of said piston.

11. In lubricant dispensing apparatus, the combination of a lubricant container, discharge means therefrom, a fluid actuated piston for expelling lubricant through said discharge means, fluid supply means to said piston, a piston rod connected to said piston and extending through said container, said piston rod having a channel therethrough communicating with passage means in said piston, said passage means being located between piston leathers and being for the reception and trapping of leakage past said leathers, indicating means associated with a marker on said piston rod to indicate the position of said piston, said indicating means being provided with a movable member co-operating with said marker to indicate initial positions of said piston regardless of the amount of lubricant in said container, said member having means for closing the channel in the piston rod in said initial positions to prevent leakage from the piston at said initial positions, said member having means for securing said member to the indicating means in said initial positions so that movement of said piston to expel lubricant will permit leakage from said piston through said channels.

12. In dispensing apparatus the combination of a container, a piston movable in said container for discharging fluid or semi-fluid from said container, said piston including a hollow head and a hollow rod connected to and communicating with said head, discharge means connected to said container, and a valve movable out of and into engagement with the end of the said hollow rod whereby passage therethrough is opened and closed to thereby permit and prevent escape of leakage which may have leaked around said piston.

13. In dispensing apparatus, the combination of a container, discharge means associated therewith, a piston disposed in said container and movable to discharge the contents of said container through said discharge means, means for operating said piston, said piston having a receiving portion for receiving leakage around said piston, a hollow piston rod secured to said piston and in communication with said receiving portion for conducting said leakage from said receiving portion, and valve means associated with said piston rod and operable to control passage of leakage from said receiving portion, said piston rod having means for reducing movement of said piston at a predetermined point.

14. In dispensing apparatus, the combination of a container, discharge means associated therewith, a fluid pressure operated piston movable in said container and having a fluid leakage receiving portion, a piston rod associated with said piston and provided with outlet means from said leakage receiving portion, said piston rod being provided with means independent of said outlet means for reducing the fluid pressure actuating said piston at a predetermined point in the travel of said piston.

15. In dispensing apparatus, the combination of a container, discharge means associated therewith, a fluid operated piston disposed in said container for dispensing the contents through said discharge means, means for introducing fluid under pressure to one side of said piston for operating the same, said piston being provided with a leakage receiving portion for preventing leakage from one side of said piston to the other, a piston rod secured to said piston and having a channel communicating with said leakage receiving portion and the atmosphere for exhausting leakage from said leakage receiving portion, said piston rod being provided with a portion independent of said channel for connecting the part of the container receiving the operating fluid with the atmosphere whereby the movement of said piston is reduced at a predetermined point.

16. In dispensing apparatus, the combination of a container, discharge means associated therewith, a fluid operated piston disposed in said container for dispensing the contents through said discharge means, means for introducing fluid under pressure to one side of said piston for operating the same, said piston being provided with a leakage receiving portion for preventing leakage from one side of said piston to the other, a piston rod secured to said piston and having a channel communicating with said leakage receiving portion and the atmosphere for exhausting leakage from said leakage receiving portion, said piston rod being provided with a portion for connecting the part of the container receiving the operating fluid with the atmosphere whereby the movement of said piston is reduced at a predetermined point, and an initial position member movable to engage said piston rod to indicate initial positions of said piston and to prevent leakage exhaustion from said piston until said piston is moved to discharge contents from said container.

17. In dispensing apparatus, the combination of a container, discharge means associated therewith, a piston disposed in said container and movable to discharge the contents of said container through said discharge means, said piston having a receiving portion for receiving leakage around said piston, a hollow piston rod secured to said piston and in communication with said receiving portion for conducting said leakage from said receiving portion, and valve means movable out of and into engagement with the end of said hollow piston rod whereby passage therethrough is opened and closed to permit and prevent escape of leakage from said receiving portion.

18. In dispensing apparatus, the combination of a container, discharge means associated therewith, a piston disposed in said container and movable to discharge the contents of said container through said discharge means, said piston having a receiving portion for receiving leakage around said piston, a hollow piston rod secured to said piston and in communication with said receiving portion for conducting said leakage from said receiving portion, and valve means movable out of and into engagement with the end of said hollow piston rod whereby passage therethrough is opened and closed to permit and prevent escape of leakage from said receiving portion, said piston rod having means for reducing movement of said piston at a predetermined point.

19. In dispensing apparatus, the combination of a container, discharge means associated therewith, a piston disposed in said container and movable to discharge the contents of said container through said discharge means, means for operating said piston, said piston having a receiving portion for receiving leakage around said piston, a hollow piston rod secured to said piston and in communication with said receiving portion for conducting said leakage from said receiving portion, and valve means associated with said piston rod and operable to control passage of leakage from said receiving portion.

20. In dispensing apparatus, the combination of a container, discharge means associated therewith, a piston disposed in said container and movable to discharge the contents of said container through said discharge means, means for operating said piston, said piston having a receiving portion for receiving leakage around said piston, a hollow piston rod secured to said piston and in communication with said receiving portion for conducting said leakage from said receiving portion, and valve means associated with said piston rod and operable to control passage of leakage from said receiving portion, said piston rod having means for reducing movement of said piston at a predetermined point by controlling the effectiveness of said means for operating said piston.

Signed at Chicago, Illinois, this 10th day of January, 1927.

ROLLIN H. MOULTON.